F. G. JOHNSON.
Gas-Governor.
No. 208,523.                     Patented Oct. 1, 1878.
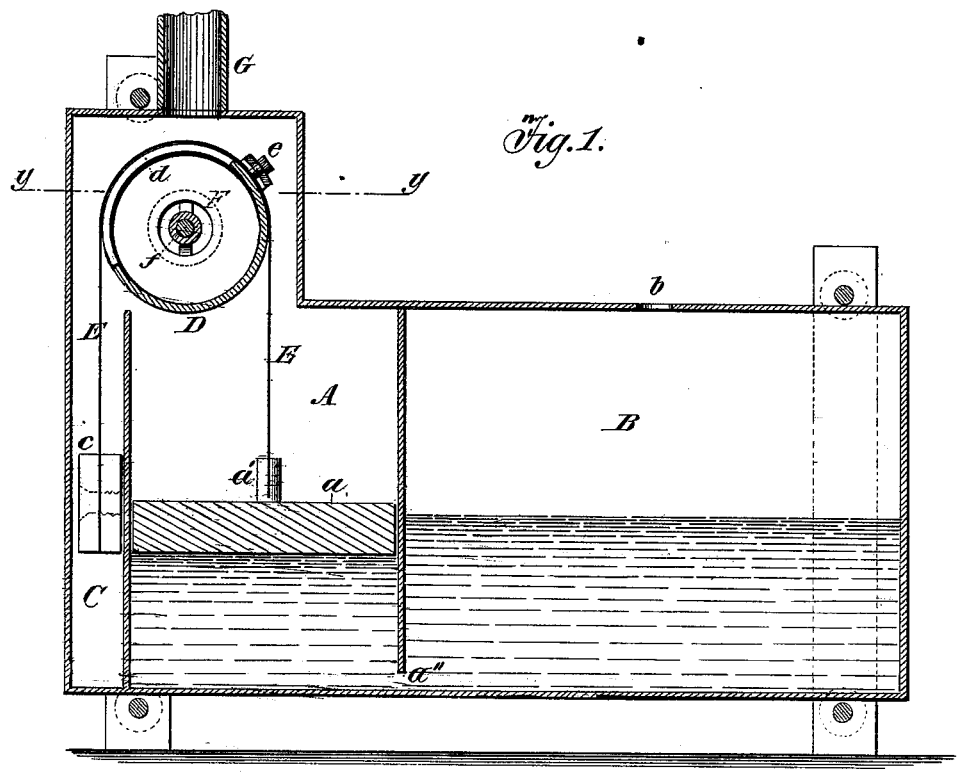
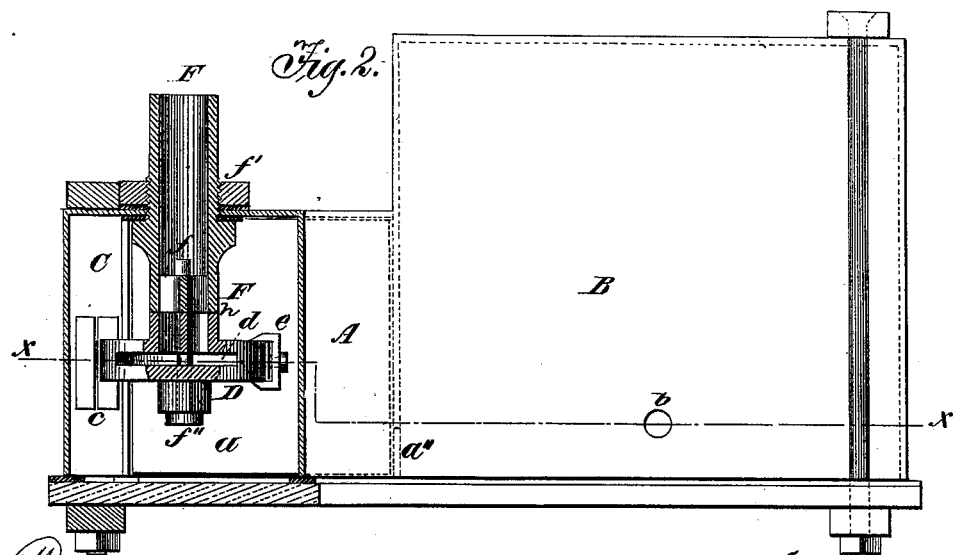
Witnesses:
O. R. Ware
R. H. Galpen
Inventor:
Frank G. Johnson

UNITED STATES PATENT OFFICE.

FRANK G. JOHNSON, OF BROOKLYN, NEW YORK, ASSIGNOR OF ONE-HALF HIS RIGHT TO ALEXANDER H. DOTY, OF SAME PLACE.

IMPROVEMENT IN GAS-GOVERNORS.

Specification forming part of Letters Patent No. 208,523, dated October 1, 1878; application filed February 6, 1878.

*To all whom it may concern:*

Be it known that I, FRANK G. JOHNSON, of the city of Brooklyn, county of Kings, and State of New York, have invented new and useful Improvements in Gas-Governors; and I do hereby declare that the following is a full, clear, and exact description of the construction and operation of the same, reference being had to the annexed drawings, making a part of this specification, in which—

Figure 1 is a vertical section drawn through the line $x\ x$, Fig. 2; and Fig. 2, a horizontal section drawn through $y\ y$, Fig. 1.

Like letters refer to like parts.

It is a well-known fact that illuminating-gas, in order to be economically employed, should be consumed under a pressure not to exceed the weight of a column of water nine-tenths of an inch in height, while it is a fact that the supply of gas from the street-mains varies from one inch and a quarter to three inches.

The object of my invention is to regulate the supply of illuminating-gas to consumers, in such a manner that each jet or burner shall be automatically furnished with only an economical supply of gas, irrespective of the surplus flow of gas through the main supply-cock, and irrespective of an excess of pressure of the gas in the main pipe, and also irrespective of the number of jets or burners that may be at any one time lighted or extinguished.

To accomplish this I provide two water-tight compartments, partially filled with water or any suitable liquid, A and B, having a free communication at $a''$, to allow the passage of a portion of the liquid from one compartment to the other.

In the compartment A is provided a float, $a$, resting on the liquid, and which is susceptible of rising and falling with the rise and fall of the liquid in this compartment. To this float is attached, at $a'$, a flexible ribbon of tin-foil or suitable metal, E E. This ribbon passes up over the periphery of a narrow hollow rotating cylindrical chamber, D, down into an empty compartment, C, and attached to a balancing-weight, $c$, which rises when the float $a$ descends, and falls when the said float rises. As the float $a$ rises and falls the rotating chamber D partially revolves by the action of the ribbon E E, the ribbon being securely attached to the said chamber D by means of a set-screw, $e$.

F is the pipe which connects the governor to the main supply-pipe, and admits the gas into the gas-tight compartment A. G is the exit-pipe, through which the gas passes from the compartment A back into the main pipe that conveys the gas to the tips or burners. $f$ is a stem or post secured to the interior of the pipe F, upon which rotates the chamber D.

The chamber D is held on the stem $f$ by the screw $f''$. This supply-pipe F is secured to the back plate of the governor by the clamping-nut $f'$.

The pipe F is cut at the line $h$, Fig. 2, and the surface of the jutting ends ground together to afford a sufficiently gas-tight joint, while it admits of an easy rotation of the chamber D on the stem or post $f$.

$d$ is a longitudinal opening cut through the periphery, of sufficient capacity to supply the burners or tips of the house of the consumer. This longitudinal opening $d$ is closed gas-tight by the metallic ribbon E E whenever it (the ribbon) strikes or presses on the periphery of the chamber D.

$b$ is a vent to the compartment B, to allow the ingress and egress of the air as the liquid rises and falls in this compartment.

The operation of my invention is described as follows: The gas from the house-main being turned on or admitted through the pipe F, it enters the revolving chamber D, and escapes through the longitudinal opening $d$ into the gas-tight compartment A, and presses upon the surface of the float $a$ and liquid, and forces the liquid through the passage $a''$ up into the compartment B until the reaction of the fluid or liquid in B equals or balances the pressure of the gas in A. As the float $a$ is depressed the ribbon E E revolves the chamber D and brings the longitudinal opening $d$ under the ribbon $a'$, which more or less cuts off the flow of the gas. When no gas is being consumed, the float $a$ will be depressed to its maximum degree, in accordance with the amount of pressure of the gas in the street-main, and nearly cut off the supply of gas by nearly closing the longitudinal opening $d$. If, now, one jet or burner of gas be lighted, a small amount of pressure of gas will be taken off the liquid in the compartment A, which will cause the float $a$ to rise by the pressure of the fluid or liquid in the compartment B, thus slightly revolving the chamber D and correspondingly opening the longitudinal passage $d$, and allowing a sufficient amount of gas to pass through to supply the one jet or burner. If additional jets be turned on or lighted, a corresponding increase of supply of gas will, in the same manner, be allowed to pass through the longitudinal opening $d$. If, now, a part of the jets or burners be turned off, the increase of pressure on the liquid in A will cause the reverse of the above action, and a corresponding amount of the supply of gas will be turned off by the closing of the longitudinal opening $d$.

I am aware that two communicating compartments, as represented by A and B, have been employed for this purpose. Therefore I do not broadly claim these alone by themselves; but What I do claim, and desire to secure as my invention by Letters Patent, is—

The revolving chamber D, provided with the longitudinal opening $d$, in combination with the metallic ribbon E E and weight $c$ and float $a$, all operated by the liquid in the compartments A and B, substantially in the manner and for the purpose set forth.

FRANK G. JOHNSON.

Witnesses:
O. R. WARE,
E. E. MALMAR.